E. A. MILHAUPT.
BUMPER.
APPLICATION FILED AUG. 13, 1917.

1,279,398. Patented Sept. 17, 1918.

Inventor
Edgar A. Milhaupt
by Hazard & Miller
Att'ys.

UNITED STATES PATENT OFFICE.

EDGAR A. MILHAUPT, OF LOS ANGELES, CALIFORNIA.

BUMPER.

1,279,398.

Specification of Letters Patent.

Patented Sept. 17, 1918.

Application filed August 13, 1917. Serial No. 185,941.

*To all whom it may concern:*

Be it known that I, EDGAR A. MILHAUPT, a citizen of the United States, residing at Los Angeles, in the county of Los Angeles and State of California, have invented new and useful Improvements in Bumpers, of which the following is a specification.

This invention relates to a bumper and particularly pertains to a fender for motor vehicles.

It is the principal object of this invention to provide a motor vehicle fender which is decidedly strong in construction, although simple in its design and easily manufactured.

Another object of this invention is to provide a fender which is not liable to become broken in case the horns of the fender are caught upon stationary objects in the path of travel of the vehicle.

Other objects will appear hereinafter.

The invention is illustrated, by way of example, in the accompanying drawings in which.

The front fender bar 10 comprises the straight central portion —*a*—, the backwardly curved end portions —*b*— and —*c*—, the return bends —*d*— and —*e*—, the forwardly and inwardly curved portions —*f*— and —*g*— parallel with the portions —*b*— and —*c*—, and the straight portions —*h*— and —*i*— extending inwardly from the portions —*f*— and —*g*— and parallel with the outer ends of the straight portion —*a*—.

The rear bar 11 extends from the inner ends of the portions —*h*— and —*i*— parallel with the intermediate portion of the straight front bar —*a*—.

Figure 2:
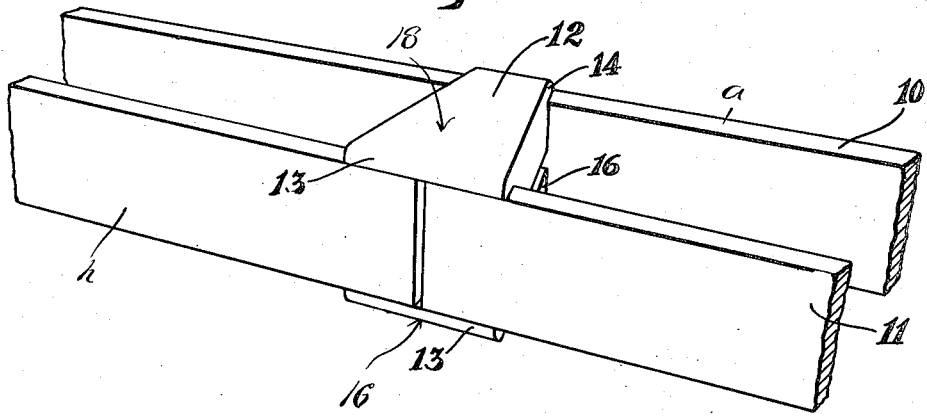
Fig. 2 is a fragmentary view in perspective illustrating one of the clamping blocks used upon the fender and further disclosing one of the split joints of the fender irons.
Figure 3:
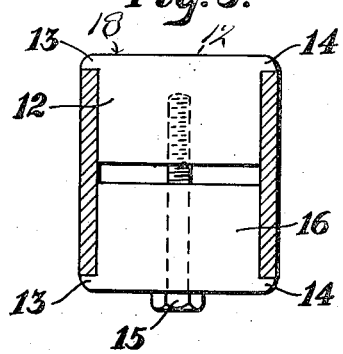
Fig. 3 is a view in transverse section as seen on the line 3—3 of Fig. 1, illustrating in detail the clamping blocks.

Clamps 18 and 19 are applied in position to connect the ends of the rear bar 11 to the ends of the portions —*h*— and —*i*—. In Figs. 2 and 3 I have shown the details of the clamp 18, it being understood that the clamp 19 is identical in construction.

The clamp 18 comprises an upper clamping block 12 having flanges 13 and 14, the flange 13 being wider than the flange 14 and extending over the edges of the meeting ends of the bars, and the body of the block extending downwardly between the bars to space the bars apart. A lower clamping block 16 is identical in construction with the upper clamping block 12 and is placed against the lower edges of the bars and between the bars, the flanges 14 of the two clamping blocks extending over the upper and lower edges of the bar 10. A bolt 15 is inserted upwardly through the clamping block 16 and screw-seated in the clamping block 12 to draw the two blocks together so as to firmly grip the edges of the bars.

Bracket arms 20 and 21 are rigidly secured to the ends of the bar 11 and extend backwardly to be secured to the vehicle for supporting the fender.

Figure 1:
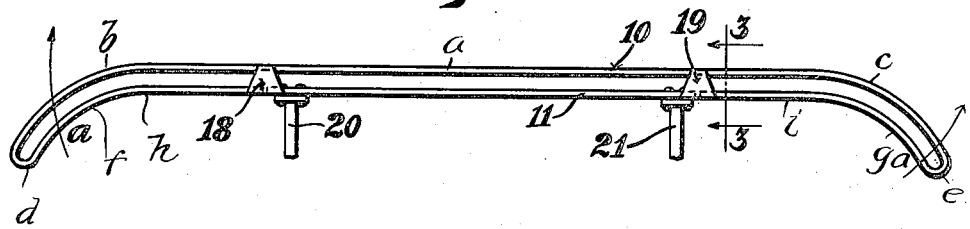
Figure 1 is a view in plan illustrating the fender as commonly designed.

When a vehicle provided with my fender strikes an object, the bar 10 may yield between the clamps 18 and 19 or either end portion may bend backwardly outside of the clamps 18 or 19. If either horn of the fender strikes an object in backing up, it may yield outwardly in the direction indicated by the arrow —*a*— in Fig. 1, and if the strain is great enough the ends —*h*— or —*i*— may be pulled out of the clamps 18 or 19 as the case may be, thus allowing the horns to bend without great damage and without breaking.

It will thus be seen that by the use of the fender here shown, objectionable blows may be warded off without material damage to the fender or the objects struck, and that the fender will possess sufficient strength to protect the car at all times. It will further be noted that the fender here shown is decidedly simple in its construction and may therefore be readily and inexpensively manufactured.

While I have shown the preferred form of my bumper as now known to me, it is evident that various changes in the combination, construction and arrangement of parts may be made by those skilled in the art without departing from the spirit of my invention.

I claim:

1. In a fender for vehicles, a front bar having an end portion curved outwardly and backwardly, a return bend in the outer end of the end portion, a return portion extending from the return bend inwardly and forwardly and parallel with the outwardly extending end portion, a pair of clamping blocks inserted between the inner end of the end portion and the inner end of the return portion and overlapping the inner end of the return portion to space the portions apart, and a bolt connecting the clamping blocks together so as to support the inner end of the return portion.

2. In a fender for vehicles, a front bar having a straight central portion, end portions curved outwardly and backwardly, return bends at the outer ends of the end portions, return portions extending from the return bends inwardly and forwardly and parallel with the outwardly extending end portions, a rear bar parallel with the straight central portion of the front bar and abutting against the inner ends of the return portions, pairs of clamping blocks inserted between the front and rear bars and overlapping the abutting ends to space the front bar from the rear bar, and bolts connecting the clamping blocks together so as to connect the abutting ends together.

In testimony whereof I have signed my name to this specification.

EDGAR A. MILHAUPT.